United States Patent
Ma

(10) Patent No.: US 8,543,737 B2
(45) Date of Patent: Sep. 24, 2013

(54) SYSTEM AND METHOD TO CONTROL ACCESS TO DATA STORED IN A DATA STORAGE DEVICE

(75) Inventor: Kenneth Ma, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 775 days.

(21) Appl. No.: 11/049,772

(22) Filed: Feb. 3, 2005

(65) Prior Publication Data

US 2005/0256983 A1 Nov. 17, 2005

Related U.S. Application Data

(60) Provisional application No. 60/570,407, filed on May 12, 2004.

(51) Int. Cl.
*G06F 3/00* (2006.01)
*H04N 7/16* (2011.01)

(52) U.S. Cl.
USPC .............................................. 710/8; 725/25

(58) Field of Classification Search
USPC ............................................................ 710/8
See application file for complete search history.

(56) References Cited

U.S. PATENT DOCUMENTS

| 244,426 | A | * | 7/1881 | Bell | 174/34 |
| 5,742,818 | A | | 4/1998 | Shoroff et al. | |
| 5,790,548 | A | * | 8/1998 | Sistanizadeh et al. | 370/401 |
| 5,802,554 | A | * | 9/1998 | Caceres et al. | 711/103 |
| 6,317,028 | B1 | * | 11/2001 | Valiulis | 340/10.1 |
| 6,400,730 | B1 | * | 6/2002 | Latif et al. | 370/466 |
| 6,505,281 | B1 | | 1/2003 | Sherry | |
| 6,721,880 | B1 | | 4/2004 | Pike | |
| 7,191,286 | B2 | | 3/2007 | Forrer, Jr. et al. | |
| 2002/0003884 | A1 | * | 1/2002 | Sprunk | 380/239 |
| 2002/0087653 | A1 | | 7/2002 | Duroj | |
| 2002/0177471 | A1 | * | 11/2002 | Kaaresoja et al. | 455/567 |
| 2003/0109218 | A1 | * | 6/2003 | Pourkeramati et al. | 455/3.05 |
| 2003/0120784 | A1 | * | 6/2003 | Johnson et al. | 709/228 |
| 2003/0135590 | A1 | * | 7/2003 | Rezaul Islam et al. | 709/220 |
| 2004/0047379 | A1 | * | 3/2004 | Kitamura | 372/45 |
| 2004/0215749 | A1 | * | 10/2004 | Tsao | 709/220 |
| 2004/0261093 | A1 | * | 12/2004 | Rebaud et al. | 725/25 |
| 2005/0015805 | A1 | * | 1/2005 | Iwamura | 725/79 |

(Continued)

OTHER PUBLICATIONS

Definition of 'IP Address' from www.xreferplus.com, 1999, Dictionary of Multimedia and Internet Application.*

(Continued)

*Primary Examiner* — Hyun Nam
(74) *Attorney, Agent, or Firm* — Brinks Hofer Gilson & Lione

(57) ABSTRACT

Various aspects of the invention provide a plurality of systems and methods of selectively enabling access to data stored in a data storage device, by one or more data processing devices communicatively coupled to the data storage device. In a representative embodiment, selective access to one or more data pools may be made as a function of one or more interfaces of the data storage device. In a representative embodiment, selective access to one or more data pools may be made as a function of one or more data file types associated with one or more data pools of the data storage device. In a representative embodiment, access to data stored in one or more data pools of the data storage device may be based on or associated with one or more types networks associated with the data storage device.

21 Claims, 5 Drawing Sheets

Share Name        My-Vacation-Video

Resides in Pool    Shared-Files

☐ Enable Share Authentication

New Password     [                    ]
Confirm Password [                    ]

☒ Enable WLAN Access

☒ Enable LAN Access

☐ Requires Physical Authentication

(56) References Cited

U.S. PATENT DOCUMENTS

| | | | | |
|---|---|---|---|---|
| 2005/0038923 | A1* | 2/2005 | Kamataki | 710/5 |
| 2005/0050160 | A1* | 3/2005 | Upendran et al. | 709/217 |
| 2005/0171661 | A1 | 8/2005 | Abdel-Malek et al. | |
| 2005/0198194 | A1* | 9/2005 | Burkey | 709/217 |

OTHER PUBLICATIONS

Definition of 'Idenity Authentication' from www.xreferplus.com, 2004, Berkshire Encyclopedia of Human-Computer Interaction.*
Definition of 'SPDIF' from www.pcmag.com, 1981, PC Magazine.*
Definition of 'enable' from www.oed.com, circa 1531, Oxford English Dictionary.*
Definition of 'associate' from www.oed.com, circa 1578, Oxford English Dictionary.*
Definition of 'appliance' from www.oed.com, circa 1613, Oxford English Dictionary.*
Definition of 'flash memory', 2001, IEEE, Inc.*
Definition of 'Identity Authentication', 2004, Berkshire Publishing Group LLC.*
Definition of 'RFID', 1986, Longman Group Ltd.*
Eagleson et al., RFID/Automotive Applications, Feb. 1997, Wireless Symposium.*
Matt Kirk, definition of 802.11, Sep. 20, 2000, Whatis.com.*
defintion of 'medium access control (MAC)', 2001, www.credoreference.com.*
Alan Simpson, Windows XP Bible, 2001, Hungry Minds, 344, 434.*
IBM Corporation, "Object-Oriented Interface Design; IBM Common User Access Guidelines", Dec. 1992, 4 pages, Que Corporation, Carmel, Indiana.

* cited by examiner

Share Name [My-Vacation-Video]

Resides in Pool Shared-Files

☐ Enable Share Authentication

New Password [                    ]

Confirm Password [                    ]

☒ Enable WLAN Access

☒ Enable LAN Access

☐ Requires Physical Authentication

Figure 4

Share Name [My-Financial-Data]

Resides in Pool Confidential-Files

☒ Enable Share Authentication

New Password [****************]

Confirm Password [****************]

☐ Enable WLAN Access

☒ Enable LAN Access

☒ Requires Physical Authentication

Figure 5

SYSTEM AND METHOD TO CONTROL ACCESS TO DATA STORED IN A DATA STORAGE DEVICE

INCORPORATION BY REFERENCE/CROSS-REFERENCE TO RELATED APPLICATIONS

This application makes reference to and claims priority from U.S. Provisional Patent Application Ser. No. 60/570,407, entitled "SYSTEM AND METHOD TO CONTROL ACCESS TO DATA IN A DATA STORAGE DEVICE", filed on May 12, 2004, the complete subject matter of which is incorporated herein by reference in its entirety.

This application makes reference to:
U.S. application Ser. No. 11/049,905, filed Feb. 3, 2005;
U.S. application Ser. No. 11/049,771, filed Feb. 3, 2005;
U.S. Application Ser. No. 60/562,847, filed Apr. 15, 2004;
U.S. Application Ser. No. 60/648,634, filed Jan. 31, 2005;
U.S. application Ser. No. 11/049,798, filed Feb. 3, 2005; and
U.S. application Ser. No. 11/049,768, filed Feb. 3, 2005.

The above stated applications are hereby incorporated herein by reference in their entireties.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Often, a user may wish to share data files that are stored in his data processing or computing device with others. The data processing or computing device may comprise a personal computer. The data files the user wishes to share may comprise data such as music or video or pictures. However, when sharing these files, other files may be vulnerable to access. These other files may contain confidential, personal, or sensitive information.

In other instances, a hacker may access sensitive data residing within a user's personal computer over wireless LAN or over the Internet. The hacker may access information such as credit card numbers or other personal information stored in one or more hard disk drives within the user's personal computer.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention provide a plurality of methods and systems of selectively enabling or disabling access to data stored in a data storage device.

Various aspects of the present invention provide a method of selectively controlling read and write access to data stored in a data storage device, in which the method comprises enabling or disabling one or more communication interfaces of the data storage device.

Various aspects of the present invention provide a method of controlling access to one or more data pools of a data storage device. The method comprises categorizing data files associated with one or more types of file formats, allocating the data files of same file format to one or more corresponding data pools of the one or more data pools, and enabling access to the one or more data pools based on the one or more types of file formats.

Various aspects of the present invention provide a method of controlling access to a data pool of a data storage device. The method comprises associating one or more data files to one or more networks or subnetworks and enabling access to the one or more data files based on the one or more networks or subnetworks.

Various aspects of the present invention provide a system for selectively enabling read and write access to data stored in a data storage device. The system comprises a memory, a set of software instructions resident in the memory, a processor capable of executing the set of software instructions, one or more data storage drives present within the data storage device, and one or more interfaces of the data storage device used to facilitate selectively enabling read and write access of the data storage device.

Various aspects of the present invention provide a system for selectively enabling access to one or more data pools of a data storage device. The system comprises a memory, a set of software instructions resident in the memory, a processor capable of executing the set of software instructions, one or more data storage drives present within the data storage device, wherein executing the set of software instructions categorizes data files associated with one or more types of file formats, and allocates the data files of same file format to a corresponding data pool of the one or more data pools, such that access to the one or more data pools is based on the type of file format.

Various aspects of the present invention provide a system for selectively enabling or disabling access to one or more data pools of a data storage device. The system comprises a memory, a set of software instructions resident in the memory, a processor capable of executing the set of software instructions, and one or more data storage drives present within the data storage device. Executing the set of software instructions associates the one or more data files to one or more networks or subnetworks and enables or disables access to the one or more data files based on the network or subnetworks.

These and other advantages, aspects, and novel features of the present invention, as well as details of illustrated embodiments, thereof, will be more fully understood from the following description and drawings.

BRIEF DESCRIPTION OF THE DRAWINGS

FIG. 4 illustrates an exemplary configuration of a graphical user interface (GUI) in which an administrative user has configured selective access to data stored in a NAS by way of enabling one or more NAS interfaces and/or enabling share authentication, in accordance with an embodiment of the invention.

FIG. 5 illustrates an exemplary configuration of a graphical user interface (GUI) in which an administrative user has configured selective access to data stored in a NAS by way of enabling one or more NAS interfaces and/or enabling one or more authentications, in accordance with an embodiment of the invention.

DETAILED DESCRIPTION OF THE INVENTION

Figure 1:
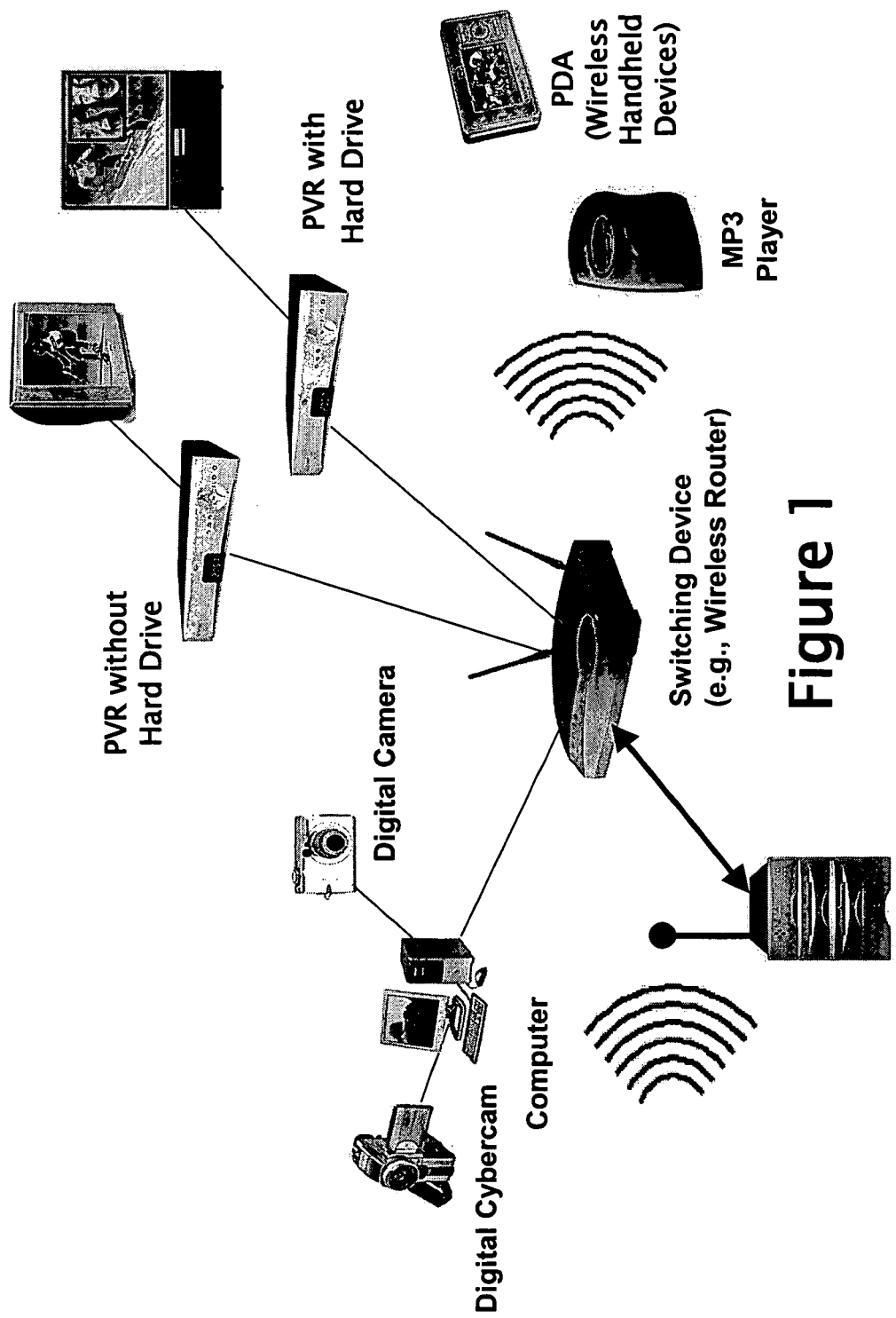
FIG. 1 illustrates a block diagram of a system incorporating the use of a network attached storage device (NAS) in accordance with an embodiment of the invention.

Various aspects of the invention provide one or more systems and methods of enabling access to data stored in a data storage device. Aspects of the invention control read and/or write access to the data stored in the data storage device. The data storage device is communicatively coupled to one or more data processing or computing devices that write to or read from the data storage device. The data storage device may communicate to the one or more data processing devices by way of a network, such as a local area network or wide area network, by way of wireless or wireline communications. In a representative embodiment, the one or more systems and methods may comprise accessing the data in the data storage device based on one or more physical or share authentication inputs provided by a user. In one or more other embodiments, access to the data in the data storage device may be based on one or more data storage device's interface(s). In a representative embodiment, the data storage device is communicatively coupled, by way of a network, such as a telecommunication or computer network, for example, to the one or more data processing or computing devices. Because the data storage device communicates by way of the network, the data storage device may be termed and referred to hereinafter as a network attached storage device (NAS). The term(s) "access to data" or "data access" used herein is intended to include access to the data storage device for performing either a read or a write data operation using the data storage device.

In a representative embodiment, the data storage device may comprise one or more data storage drives, such as hard disk drives. The data storage device may comprise a combination of different types of data storage drives. A data storage drive may comprise any type of media capable of storing data.

In a representative embodiment, the data stored in the NAS comprises audiovisual or multimedia data. The data may comprise any type of video or audio data such as MPEG data generated by a telecommunications carrier such as a cable operator. In other embodiments, the data may comprise any type of data capable of being stored in a hard disk drive. The NAS may be communicatively coupled to one or more data processing devices. The one or more data processing or computing devices may comprise a desktop computer, a laptop computer, a PDA, a cellular phone, a digital camera, a video camcorder, digital recorder or MP3 player, or any other device capable of playing the data stored in the NAS.

In a representative embodiment, access to data stored in NAS may occur by authenticating one or more users. For example, selective access to data may be performed by way of providing share access to one or more data pools partitioned within the NAS. One or more users may be authenticated, for example, when their respective passwords are input from a data processing device (e.g., a computer) communicatively coupled to the NAS. In a representative embodiment, the data processing device may communicate to the NAS over a wireless or wireline network. After share access authentication is successfully performed, a data processing device may write to or read from one or more data pools provided by the NAS. The one or more data pools may be formed, for example, by concatenating one or more portions of one or more hard disk drives used within the NAS, using software or firmware executed within the NAS. The software or firmware may perform formatting and partitioning of drive space in order to generate the one or more data pools. One example of data pooling may be found in U.S. patent application Ser. No. 60/648,634, entitled "METHOD AND SYSTEM OF DATA STORAGE CAPACITY ALLOCATION AND MANAGEMENT USING ONE OR MORE DATA STORAGE DRIVES" and filed on Jan. 31, 2005, the complete subject matter of which is incorporated herein by reference in its entirety.

In a representative embodiment, selective access to one or more data pools may be made as a function of the data file types or formats stored in the one or more data pools of the data storage device. In a representative embodiment, the one or more data pools may comprise data files of one or more types or formats, in which access to such data pools may be made by one or more users based on one or more data file types. The data file type may be specified by the data file's suffix. For example, the suffix may comprise the following: *.mp3, *.doc, *.ppt, *.jpeg, or any other type of data file suffix. In a representative embodiment of the present invention, one or more types of data may comprise a data pool. For example, the data files may comprise a PVR file, MP3 file, MPEG file, or any other type of file. The categorization may be performed using any one of a number of attributes or parameters. After the data pools are categorized by media type, one or more users may be given selective access to the data pool. In a representative embodiment, an administrator may configure the NAS to provide access privileges in which one or more users may access a data pool containing only music files or .mp3 files.

In a representative embodiment, access to the data stored in the data storage device may be based on or associated with one or more types of ports or interfaces. In a representative embodiment, a particular data pool may be categorized by way of one or more NAS ports or interfaces. For example, a NAS port or interface may comprise any one or the following exemplary types of ports or interfaces: 802.3x (Ethernet), a USB, a wireless 802.11x, IEEE 1394, Bluetooth, Multiband OFDM (orthogonal frequency division multiplexing) Alliance (MBOA) Ultrawideband, standard telephone line, power line, coaxial cable, and the like. In a representative embodiment, a data processing device that is communicatively coupled to a particular port or interface of the NAS may be associated with a particular data pool. For example, a particular data pool may be inaccessible to data processing devices that do not communicate through the particular port or interface.

In another representative embodiment, a data pool may be accessible only to data processing devices that are associated with a particular network or subnetwork. For example, only those IP addresses associated with a network or subnetwork may access data from a particular data pool. In another representative embodiment, access to data stored in one or more data pools of the NAS may be based on one or more MAC addresses.

Aspects of the invention provide for the generation of one or more data pools that may be configured as a logical drive. The data pools may be accessed by one or more groups or types of users. Selective access to data stored within the NAS may be performed by allocating one or more users to a share access directory associated with the one or more logical drives, for example. The share access permits one or more predetermined users to access data stored in the one or more data pools.

In a representative embodiment, access to data stored in the NAS may occur only when a user, who wishes access to the data stored in the NAS, is successfully authenticated, by one or more authentication methods. In addition to password authentication, authentication may be accomplished using actuator or device based authentication. For example, an actuator may comprise a push button physically located on a NAS. The push button may be depressed by a user who wishes access to the data in the NAS. In a representative embodiment, a user must input his password within a designated time after depressing the push button, in order to access the data. In other embodiments, the authentication mechanism may comprise, a radio frequency identification device (RFID) or biometric data device. The biometric data may comprise fingerprint or retinal information, for example. The use of physical authentication methods as previously described may or may not require the use of password authentication (i.e., share authentication). It is contemplated that in one or more other embodiments, an administrative user may input a username and password for use in share authentication.

FIG. 1 illustrates a block diagram of a system incorporating the use of a network attached storage device (NAS) 100 in accordance with an embodiment of the invention. The NAS 100 provides data storage for one or more data processing devices. As illustrated, a switching device provides connectivity of the NAS 100 to the one or more data processing devices. In this representative embodiment, the NAS 100 is connected to the switching device by way of a wireline connection. The wireline connection may comprise an Ethernet connection, for example. The NAS 100 may also communicate wirelessly as shown. The type of wireless communication may comprise 802.11x, Bluetooth, circuit switched cellular, Multiband OFDM Alliance (MBOA) Ultrawideband, or the like. The switching device is capable of providing connectivity using wireless or wireline communications. For example, a router may utilize any one of the following wireless or wireline data communications protocols: 10/100 Ethernet, gigabit Ethernet, 802.11x, Bluetooth, and the like. The one or more data processing devices the NAS 100 communicates with comprises devices such as a digital cybercam, digital camera, MP3 player, PDA, and one or more personal video recorders (PVRs). As illustrated, the one or more PVRs may be equipped with or without a data storage drive (e.g., a hard disk drive). In a representative embodiment, the PVR may be referred to as a set-top-box (STB) having personal video recorder capabilities. In a representative embodiment, the PVR may be referred to as a PVR-STB. The PVRs illustrated, are connected to a television or a monitor capable of playing multimedia content to a home user. Use of the NAS 100 provides a centralized storage device for multimedia content received by the one or more PVRs. By way of storing content in a NAS 100, PVRs lacking a storage facility, such as a hard disk drive, may store any data it receives into the NAS 100. Further, any data stored by other data processing devices, including PVRs, may be easily accessed and viewed by any of the one or more data processing devices. For example, a PVR without hard drive may access multimedia content originally stored into the NAS 100 by a PVR with hard drive, and vice-versa. As a result, the NAS 100 facilitates sharing of data among the one or more data processing devices. The NAS 100 may be considered a "virtual storage device" by the one or more data processing devices. The NAS 100 is configured such that its storage capacity may be easily expanded. For example, the NAS may be configured for expansion, by providing one or more physical ports or openings in its chassis, in which one or more hard disk drives, or other devices capable of storing data, may be received by the NAS 100. As such, the NAS 100 provides an easily scalable and flexible storage mechanism that accommodates for future data storage growth. In addition to its scalability, the NAS 100 provides data mirroring and data striping capabilities. The data mirroring and striping capabilities may comprise one or more RAID levels, such as RAID levels 0, 1, and 0+1.

Figure 2:
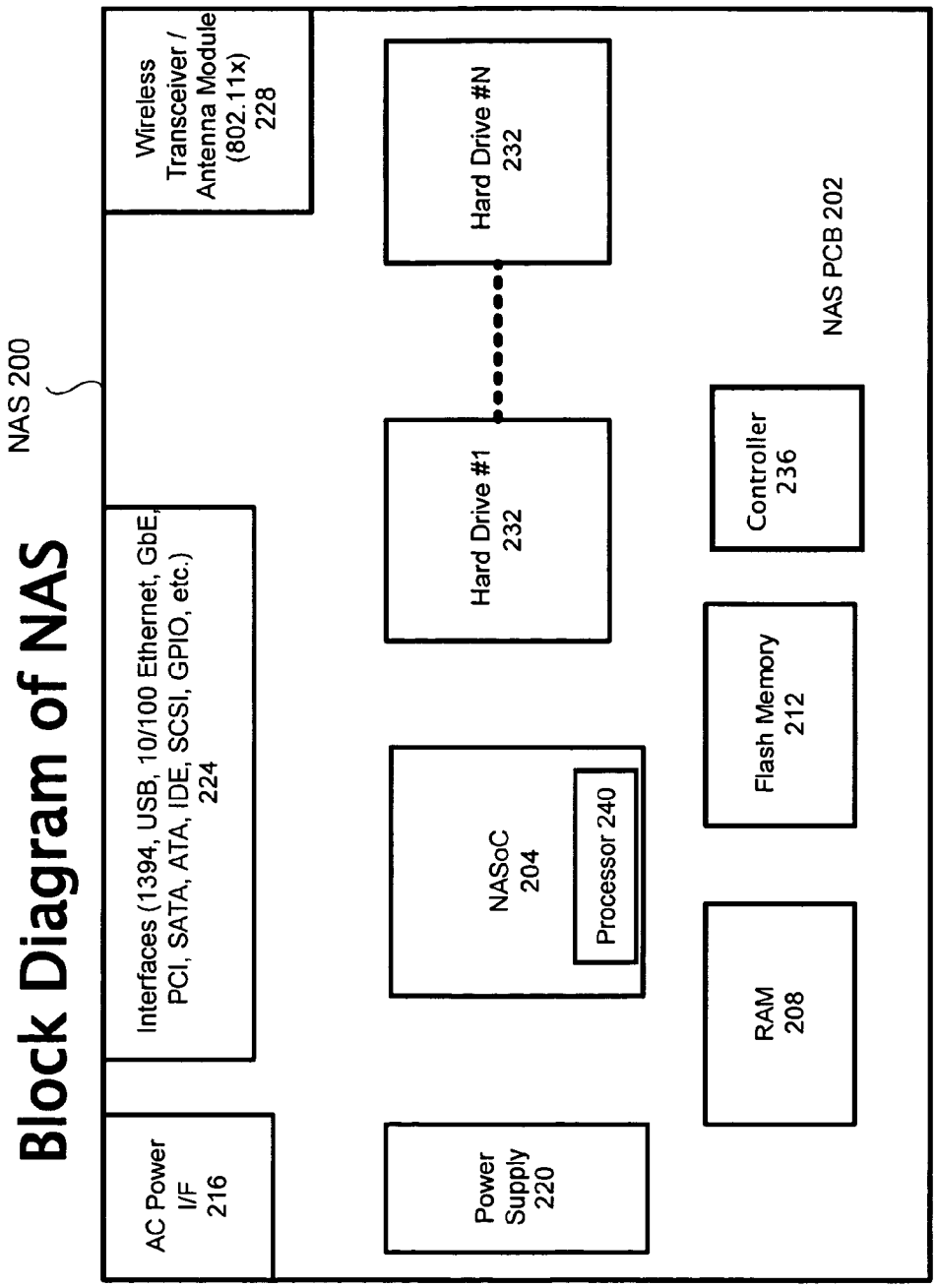
FIG. 2 is a block diagram of a network attached storage device (NAS) in accordance with an embodiment of the invention.

FIG. 2 is a block diagram of a network attached storage device (NAS) 200 in accordance with an embodiment of the invention. The NAS 200 may comprise a housing and/or chassis that effectively seats a printed circuit board (NAS PCB) 202. As illustrated, the NAS PCB 202 seats one or more components. The one or more components are electrically connected by way of the printed circuit board (PCB) 202. The one or more components comprises a network attached storage device integrated circuit chip or NAS on chip (NASoC) 204, a random access memory 208, a flash memory 212, an AC power interface 216, a power supply 220, a block of interfaces 224, a wireless transceiver/antenna module 228, one or more hard disk drives 232, and a controller 236. The interface block 224 may comprise one or more of the following interfaces: IEEE 1394, USB, 10/100 Ethernet, gigabit Ethernet, PCI, SATA, ATA, IDE, SCSI, GPIO, or the like. The wireless transceiver/antenna module 228 may comprise an attachable module or mini-PCI card that may be optionally connected or attached to the NAS printed circuit board 202. The wireless protocol may comprise 802.11x, Bluetooth, circuit switched cellular, or the like. The interface block 224 and wireless transceiver/antenna module 228 may be used by the NAS 200 to authenticate users that seek access to one or more data pools in the NAS 200. The one or more hard disk drives 232 may comprise any number of hard drives depending on the design of the NAS 200. The printed circuit board 202 may be configured to accommodate an appropriate number of hard disk drives. The number of hard drives utilized may depend on the type of mirroring or data striping (i.e., RAID) provided by the NAS 200. In a representative embodiment, the controller 236 provides control for any one of several devices connected to the NASoC 204. The NASoC 204 may comprise an integrated circuit chip incorporating a processor or central processing unit (CPU) 240. The NASoC 204 may comprise one or more logic circuits. The one or more logic circuits are capable of providing the functions and operations that allow selective access to data stored in one or more data pools of the NAS 200 by one or more data processing devices.

The aforementioned methods for selective access may be executed by way of the NAS 200 executing a software (or firmware) resident in a memory of the NAS 200. The execution of the software may be controlled and monitored by way of a personal computer (PC) communicatively coupled to the NAS 200. The software may be downloaded into a memory (e.g., 212) of the NAS 200 by way of control and communication, for example, from a remote PC or other data processing or computing device. In a representative embodiment, the memory comprises the flash memory 212 described in reference to FIG. 2. As referenced in FIG. 2, the NAS 200 may comprise a motherboard or printed circuit board (PCB) 202 containing the memory (e.g., 212) in which the software may be stored. In addition, the PCB 202 may incorporate a processor or CPU 240 that performs the execution of the software resident in the memory (e.g., 212), that implements the one or more selective accessing schemes previously discussed. In a representative embodiment, the processor 240 is incorporated within the NASoC 204 previously described in reference to FIG. 2.

Figure 3:
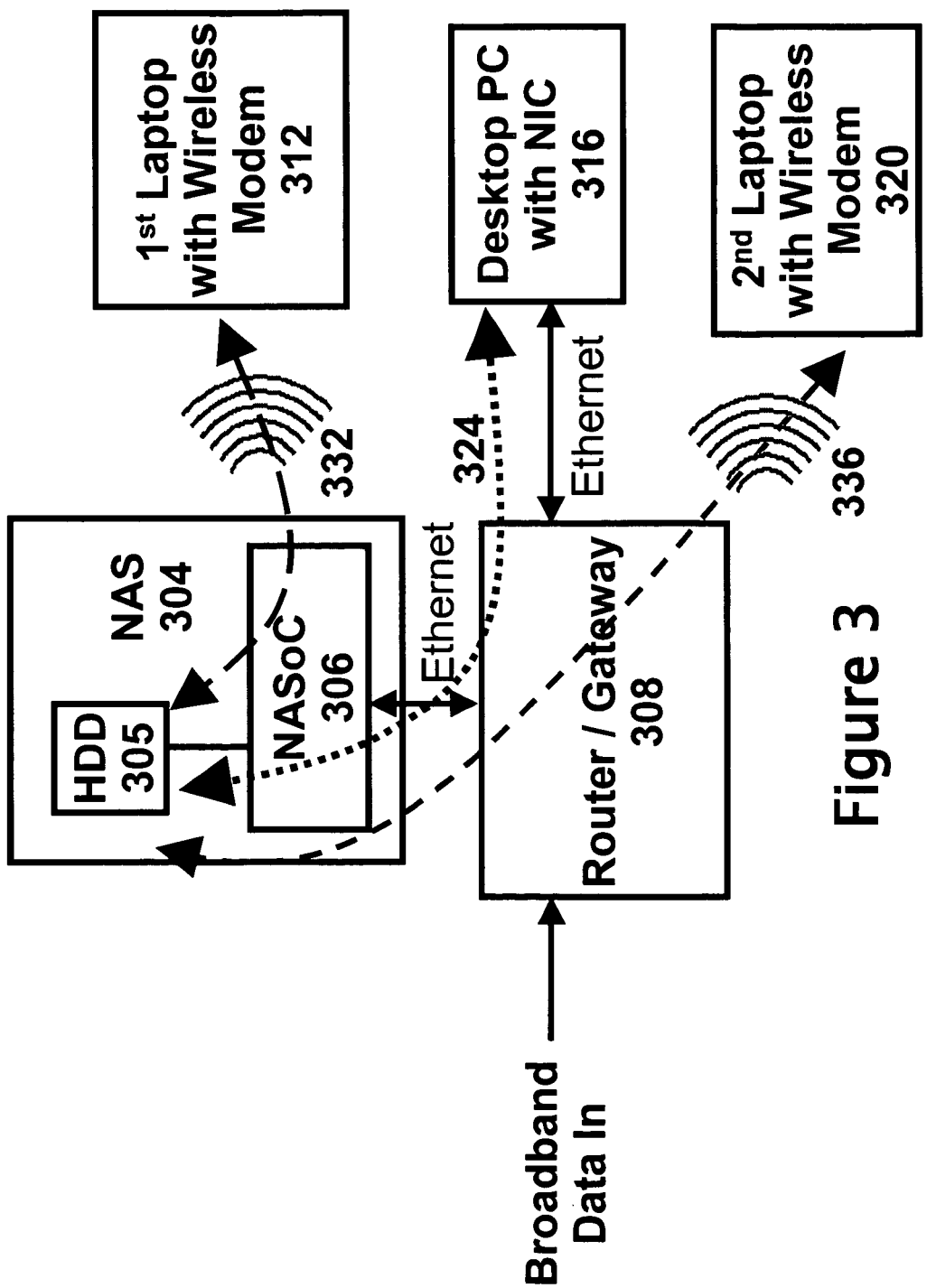
FIG. 3 is a block diagram of a system that illustrates selective access to data stored in a NAS, by way of using one or more NAS communication interface types, in accordance with an embodiment of the invention.

FIG. 3 is a block diagram of a system that illustrates selective access to data stored in a NAS 304, by way of using one or more NAS communication interface types, in accordance with an embodiment of the invention. As shown, the NAS 304 may communicate to the one or more data processing devices either directly by way of wireless communication (e.g., wireless local area network (LAN)) 332 or indirectly by way of wireline communication (e.g., local area network (LAN)) 324, 336 through the router/gateway 308. Accordingly, the NAS 304 may utilize one or more of its wireless or wireline communication interface(s). In a representative embodiment, the NAS 304 comprises one or more hard disk drives (HDD) 305 and a network attached storage device integrated circuit chip (NASoC) 306. As shown, the router/gateway 308 may communicate either by wireline or wirelessly. The router/gateway 308 may receive broadband data such as video programming or other data from a telecommunications provider. Using its wireless transceiver/antenna module, the NAS 304 may communicate directly 332 to a first laptop PC with wireless modem 312. The router/gateway 308 may act as a communications interface between the NAS 304 and other data processing devices such as a desktop PC with network interface card 316 and a $2^{nd}$ laptop PC with wireless modem 320. The router/gateway 308 may communicate to the other data processing devices either wirelessly or by wireline communications. In this example, the router/gateway 308 communicates to the desktop PC 316 using a wireline Ethernet connection; however, the router/gateway 308 communicates to the laptop PC 320 using wireless communications. The wireless communications used in this representative embodiment may comprise 802.11x, Bluetooth, circuit switched cellular, for example.

The embodiment of FIG. 3 illustrates how one or more NAS interfaces may be used to selectively control data access to one or more data processing devices, in accordance to an embodiment of the invention. In this representative embodiment, selective access is performed by way of the type of NAS communication interface the one or more data processing devices uses to connect and communicate with the NAS 304. For example, the NAS 304 may communicate to the one or more data processing devices over a wireless or wireline type of NAS interface. Further, the wireless interface may comprise a wireless LAN interface, such as an 802.11x interface. On the other hand, the wireline interface may comprise an Ethernet interface, for example. It is further contemplated that other factors or characteristics of the one or more NAS interfaces (i.e., such as a Bluetooth type of wireless interface or USB type of wireline interface, for example), may be used to further categorize the one or more data processing devices which access data stored in the NAS 304.

FIG. 4 illustrates an exemplary configuration of a graphical user interface (GUI) in which an administrative user has configured selective access to data stored in a NAS by way of enabling one or more NAS interfaces and/or enabling share authentication, in accordance with an embodiment of the invention. As indicated by the GUI, the one or more NAS interfaces comprise wireless local area network (WLAN) and local area network (LAN) interfaces, for example. In this representative embodiment, one or more data processing devices may be selectively allowed access to the data stored in the NAS by way of the GUI shown in FIG. 4. As shown, the GUI comprises a share name, data pool name, new password and confirm password fields. In addition, the GUI comprises one or more radio buttons that allow a user to configure whether share authentication (i.e., using a username and/or password input by a user) is to be enabled or disabled, whether wireless local area network (WLAN) access is to be enabled or disabled, whether local area network (LAN) access is to be enabled or disabled, or whether physical authentication is to be enabled or disabled. The physical authentication may comprise the actuator based (e.g., push-button) type of authentication method previously discussed, for example, or any other like mechanism. The push-button actuator may communicate to the NAS by way of wireless or wireline communications. In a representative embodiment, share authentication must be performed within a period of time after physical authentication occurs. For example, a correct password must be input within a certain amount of time after the push-button of the actuator is depressed, in order to access data stored in the NAS. The use of physical authentication methods may or may not require the use of one or more other authentication methods (i.e., for example, use of passwords in share authentication).

In this representative embodiment, the share name is configured by a user using the share name "My-Vacation-Video". In this representative embodiment, the share name is associated with the data pool named "Shared-Files". Since share authentication is not enabled, password inputs are not required for the new password or confirm password fields. As a result, these fields are left blank. In this representative embodiment, the "Enable WLAN Access" and the "Enable LAN Access" radio buttons are selected, while the "Requires Physical Authentication" radio button is not selected. Hence, an administrative user, in this representative embodiment, configures the NAS, by way of the GUI, such that access to the "Shared-Files" data pool is allowed when a data processing device accesses data stored in the NAS by way of either wireless LAN or LAN interfaces. However, in this embodiment, no authentication, such as password or physical authentication is required. In reference to FIG. 3, communication paths 324, 332, 336 are all enabled for the GUI configuration illustrated in FIG. 4. Although not illustrated in the embodiment of FIG. 4, other specific types of interfaces (e.g., 802.11b) and other types of authentication mechanisms (e.g., biometric) may be employed by the NAS and configured using the GUI.

FIG. 5 illustrates an exemplary configuration of a graphical user interface (GUI) in which an administrative user has configured selective access to data stored in a NAS by way of enabling one or more NAS interfaces and/or enabling one or more authentications, in accordance with an embodiment of the invention. As shown, the GUI comprises a share name, data pool name, new password and confirm password fields. In addition, the GUI comprises one or more radio buttons that allow a user to configure whether share authentication is to be enabled or disabled, whether wireless local area network (WLAN) access is to be enabled or disabled, whether local area network (LAN) access is to be enabled or disabled, or whether physical authentication is to be enabled or disabled. The physical authentication may comprise the actuator based (e.g., push-button) type of authentication method previously discussed. In this representative embodiment, the share name is configured by a user using the share name "My-Financial-Data". In this representative embodiment, the share name is associated with the data pool named "Confidential-Files". Since share authentication is enabled, the administrative user must provide inputs for one or more new password and confirm password fields, which allow access to one or more users who wish access to the data storage device. In this representative embodiment, the Enable WLAN access radio button is not selected while the Enable LAN access and Requires Physical Authentication radio buttons are selected. Hence, an administrative user in this representative embodiment, configures the NAS, by way of the GUI, such that access to the NAS (e.g., the "Confidential-Files" data pool) is allowed when a data processing device accesses data in the NAS by way of a LAN interface of the one or more interfaces of the NAS. In addition, authentication by way of password and physical authentication is required. As discussed previously, the physical authentication may be based on depressing an actuator, for example, or any other like mechanism. In reference to FIG. 3, only communication paths 324, 336 are enabled, since communication is established by way of a NAS LAN Ethernet connection. Although communication path 336 utilizes wireless communication for some portion of the communication path 336, the communication interface enabled from the perspective of the NAS 304 comprises a LAN interface. Although not illustrated in the embodiment of FIG. 5, other communication interface types and authentication mechanisms may be employed in the NAS and configured using the GUI.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A network attached storage device comprising:
   one or more data storage drives defining storage space, the storage space divided into a plurality of data pools;
   a plurality of communication interfaces for external data communication;
   memory to store information defining selective access to the plurality of data pools;
   a storage controller in data communication with the memory, the one or more data storage drives and the plurality of communication interfaces, the storage controller operative to
      receive from an administrative user information defining a specific data pool among the plurality of data pools and a specific communication interface of the plurality of communication interfaces from which a received request will be authenticated to access the specific data pool,
      identify a request to access a respective data pool of the plurality of data pools and identify a respective communication interface of the plurality of communication interfaces with which the identified request is received at the network attached storage device, the storage controller further operative to authenticate the identified request to access the respective data pool when access to the respective data pool has been previously authorized using the stored information defining selective access to the plurality of data pools.

2. The network attached storage device of claim 1 further comprising a control circuit operative to provide a user interface to the administrative user to receive access configuring information from the administrative user and to store the access configuring information in the memory.

3. The network attached storage device of claim 2 wherein the storage controller is responsive to receive access configuring information and thereby to define a new data pool among the storage space and to store in the memory information defining selective access to the new data pool.

4. The network attached storage device of claim 3 wherein the user interface is operative to receive from the administrative user information defining a share name for the new data pool and information defining a password for user authentication during subsequent access to the new data pool.

5. The network attached storage device of claim 2 wherein the control circuit is further operative to receive from the administrative user information defining a specific data pool among the plurality of data pools and an identifier for a specific network or subnetwork from which a received request will be authenticated to access the specific data pool.

6. The network attached storage device of claim 2 wherein the plurality of communication interfaces comprises a wireline interface and a wireless interface and wherein the stored information defining selective access to the plurality of data pools associates a first particular data pool for access by the wireline interface and a second particular data pool for access by the wireless interface.

7. A method for a network attached storage device, the method comprising:
   at the network attached storage device,
   receiving from an administrative user information defining a plurality of data pools;
   receiving from the administrative user information defining access to respective data pools of the plurality of data pools, the information associating a respective file type of one or more file types with the respective data pools of the plurality of data pools so that only data files having the associated respective file type can be read from or written to the respective data pool;
   subsequently, receiving from a user a request for access to a data pool, the user request specifying a data file and a file type for the data file;
   categorizing the user request using the file type;
   comparing the file type of the categorized user request with the information defining access to the respective data pools; and
   permitting access for the user and the data file to a respective data pool only if the file type of the categorized user request matches the information defining access to the respective data pool.

8. The method of claim 7 further comprising:
   receiving from the administrative user information defining access to respective data pools of the plurality of data pools, the information associating a respective data communication port of the one or more data communication ports of the network attached storage device with the respective data pools so that only data files communicated through the associated respective data communication port are accessible in the respective data pools;
   subsequently, receiving at a particular data communication port of the network attached storage device a user request for access to a data pool;
   comparing identification of the particular data communication port of the received user request with the information defining access to respective data pools of the plurality of data pools; and
   permitting access for the user and the data file to a respective data pool of the plurality of data pools only if the identification of the particular data communication port matches the information defining access to the respective data port based on the comparison.

9. The method of claim 8 wherein receiving the information associating one or more data communication ports of the network attached storage device with the respective data pools comprises:
   receiving from the administrative user information associating a wireless communication port of the of the network attached storage device with a first data pool;
   receiving from the administrative user information associating a wireline communication port of the of the network attached storage device with a second data pool; and storing the received administrative user information in a memory of the network access storage device.

10. The method of claim 9 further comprising:
receiving at the wireless communication port a user request for access to the second data pool;
comparing identification of the wireless communication port with the stored administrative user information; and
denying the request to access the second data pool based on the comparison.

11. The method of claim 7 further comprising:
receiving from the administrative user information defining access to respective data pools of the plurality of data pools, the information associating a respective network or subnetwork of one or more networks or subnetworks in data communication with the network attached storage device with the respective data pools of the plurality of data pools so that only data files associated with the respective network or subnetwork are accessible in the respective data pools;
subsequently, receiving at the network attached storage device a user request for access to a data pool;
identifying a network or subnetwork from which the user request was received;
comparing the identification of the network or subnetwork for the received user request with the information defining access to respective data pools of the plurality of data pools; and
permitting access for the user and the data file to a respective data pool only if the identification of the network or subnetwork matches the information defining access to the respective data pool.

12. A network attached storage device comprising:
a wireline interface circuit operable for data communication over one or more wireline networks with remote data devices;
a wireless interface operable for wireless data communication with remote wireless sources;
disk storage segmented into a plurality of data pools, the data pools formed by selectively concatenating one or more portions of one or more hard disk drives of the disk storage;
memory to store data; and
a controller in data communication with the wireline interface circuit, the wireless interface circuit, the memory and the disk storage and operable to
provide user interface data over either a wireline network or to a remote wireless source to form a user interface at a remote data processing device, the user interface adapted to receive access configuration data from an administrative user at the remote data processing device, and
control access to respective data pools of the plurality of data pools based on the access configuration data.

13. The network attached storage device of claim 12 wherein the controller is operative to provide user interface data to the remote processing device to prompt the administrative user to enable share authentication to limit access to a specified data pool for only a remote data device or a remote wireless source providing authentic credentials.

14. The network attached storage device of claim 12 wherein the controller is operative to provide user interface data to the remote processing device to prompt the administrative user to enable share authentication to limit access to a specified data pool for only a remote data device or a remote wireless source providing a password initially set by the administrative user.

15. The network attached storage device of claim 12 wherein the controller is operative to provide user interface data to the remote processing device to prompt the administrative user to enable access to a specified data pool for only a remote data device accessing the network attached storage via the wireline interface circuit.

16. The network attached storage device of claim 12 wherein the controller is operative to provide user interface data to the remote processing device to prompt the administrative user to enable access to a specified data pool for only a remote wireless source accessing the network attached storage via the wireless interface.

17. The network attached storage device of claim 16 wherein the controller is further operative to store in the memory access control data provided by the administrative user for controlling access to respective data pools.

18. A method for a network attached storage device, the method comprising:
at the network attached storage device,
communicating data to a remote data processing device to establish a user interface at the remote data processing device, the user interface accessible by an administrative user to provide access control data to the network attached storage device;
receiving from the remote data processing device data pool data defining one or more data pools for storage of user data;
in response to the data pool data, concatenating one or more portions of disk storage of the network attached storage device to define one or more data pools;
receiving from the remote data processing device data pool access data;
subsequently using the received data pool access data to limit access to the one or more data pools.

19. The method of claim 18 wherein receiving data pool access data comprises:
receiving file type data defining for a particular data pool of the one or more data pools a type of data file that may be stored or read from the particular data pool, and
storing the received file type data in the memory in association with information for the particular data pool,
and further comprising receiving a request to access a data file stored with the particular data pool, and wherein using the received data pool access data to limit access comprises comparing the file type data stored in the memory with a file type of the request to access and authenticating the access only in the case of a file type match.

20. The method of claim 18 wherein receiving data pool access data comprises:
receiving port type data defining for a particular data pool of the one or more data pools a type of data communication port of the network attached storage device will be authenticated to access the particular data pool, and
storing the received port type data in the memory in association with information for the particular data pool,
and further comprising receiving at a particular data port of the network attached storage device a request to access a data file stored with the particular data pool, and wherein using the received data pool access data to limit access comprises comparing the port type data stored in the memory with information about the particular port and authenticating the access only in the case of a port type match.

21. The method of claim 20 further comprising:
communicating data to the remote processing device to establish on the user interface:
a data pool identifier for specified data pool, and
selection buttons specifying one or more of permitted wireless access at the network attached storage device to the specified data pool, or
permitted wireline access at the network attached storage device to the specified data pool, or both.

* * * * *